United States Patent Office 3,098,097
Patented July 16, 1963

3,098,097
UNSATURATED ALIPHATIC AMINO-DIOLS

Cyril Grob and Erwin F. Jenny, Basel, Switzerland, assignors to Ciba Corporation, a corporation of Delaware
No Drawing. Filed July 3, 1958, Ser. No. 746,346
Claims priority, application Switzerland July 12, 1957
5 Claims. (Cl. 260—584)

This invention provides new unsaturated aliphatic amino-diols of the formula $$CH_3(CH_2)_n—A—CHOH—CHNH_2—CH_2OH$$

in which A stands for the radical of the formula $$—CH=CH— \text{ or } —C\equiv C—$$

and $n$ for the whole numbers 7, 9 and primarily for 11, and their acyl compounds, in the form of their various isomers, such as the threo- and erythro-compounds, their cis- and trans-forms and their optical antipodes.

As acyl compounds there may be named especially compounds acylated with an aliphatic carboxylic acid, preferably with a lower alkanoic acid, primarily acetic acid.

The invention also provides processes for the manufacture of these new compounds. The new compounds possess valuable pharmacological activities and are intended for use as medicaments or as intermediate products for the manufacture thereof. Thus they exhibit, more especially the threo-cis-1:3-dihydroxy-2-amino-heptadec-4-ene, a strong activity against thrush and can be used as fungicides. Moreover they possess also, primarily the threo-1:3-dihydroxy-2-amino-heptadec-4-yn, anti-fibrillatory activity and are intended as cardiac remedies. In addition they retard blood-coagulation.

The new compounds are obtained when compounds of the formula $CH_3(CH_2)_n—C\equiv C—CHO$, in which $n$ has the above significance, are condensed with β-nitroethanol, the resulting compounds of the formula $$CH_3(CH_2)_n—C\equiv C—CHOH—CHNO_2—CH_2OH$$

if desired after resolution into their stereo-isomers, reduced to the corresponding 2-amino compounds and, if desired, the triple bond converted into a double bond and/or resulting amino-diols converted into the acyl derivatives and/or resulting racemates resolved into their optical antipodes and/or resulting bases converted into their salts or resulting salts into the free bases.

The condensation of the unsaturated aldehyde with β-nitroethanol can be carried out in the manner known per se. The reduction of the nitro diols is preferably carried out with zinc and hydrochloric acid or with iron and acetic acid. It can, however, also be carried out in other acidic media, for example, by means of aluminum amalgam in ether and a little glacial acetic acid. Prior to the specified reduction, the compounds previously obtained of the formula $$CH_3(CH_2)_n—C\equiv C—CHOH—CHNO_2—CH_2OH$$

can be resolved into their diastereo-isomers, preferably by crystallization. The subsequent reactions can be carried out in any desired sequence. Thus the resulting amino group can be acylated in the manner known per se. Also the triple bond can be converted into a double bond, for which purpose preferably hydrogen is used in the presence of a Lindlar-catalyst or a palladium catalyst poisoned with quinoline. By this means cis-compounds are obtained. For the production of the transisomers reduction is preferably carried out with an alkali metal, especially sodium or lithium, in the presence of an alcohol, or with a di-metal hydride, such as lithium-aluminum hydride, or the cis-compound is isomerized with acid agents, for example dilute aqueous sulfuric acid in dioxane.

Alternatively, the nitro group and the triple bond may be reduced simultaneously. To this end the nitro-alk-4-yn compounds are treated preferably with a di-metal halide, such as lithium-aluminum hydride, and trans-amino-alk-4-enes obtained. Corresponding cis-compounds are obtained by treatment with catalytically activated hydrogen, such as hydrogen in the presence of a Lindlar catalyst, the first stage, namely, the reduction of the triple bond to the double bond proceeding rapidly, and the second stage, i.e. the reduction of the nitro group, proceeding slowly. The reduction in the presence of the Lindlar catalyst is preferably carried out in alcohol, cis-1,3-dihydroxy-2-nitro-alk-4-enes being obtained as intermediate products after the combination of 1 molecular equivalent of hydrogen. If desired, these intermediate products can be isolated. When the treatment is performed with hydrogen in the presence of a platinum catalyst, the reduction is interrupted when the quantity of hydrogen required for the reduction has been absorbed. In these reductions mixtures of different reaction products are often obtained. They can be separated in the usual manner. The above-mentioned reactions are advantageously carried out in the presence of rectified alcohol.

Resulting amino-diols can, when desired, be converted in the manner known per se into acyl derivatives or resulting acyl derivatives into the free amino-diols. Moreover resulting racemates can be resolved into their optical antipodes, for example, by treatment with optically active glutamic acid or microbiological methods.

In a modified form for this process, resulting compounds of the formula $$CH_3(CH_2)_n—C\equiv C—CHOH—CHNO_2—CH_2OH$$

are first reacted with an aldehyde, whereupon in the resulting nitro-m-dioxanes, if desired after isomerization, the nitro group is reduced, if desired the resulting amino group acylated, then the dioxane ring split up and, if desired, resulting acyl derivatives converted into the free bases. Furthermore, if desired, at any stage after the reduction of the nitro group the triple bond can be converted into a double bond. The reaction with an aldehyde, especially an aromatic aldehyde, primarily benzaldehyde, is preferably carried out in the presence of an acid condensing agent such as zinc chloride, whereby 5-nitro-m-dioxanes are obtained. These can be easily isomerized on the carbon atom attached to the nitro group, for example by heating to elevated temperature or by treatment with alkaline agents. In this conversion the threo-configuration is preferably converted into the erythro-configuration. In the resulting nitro-m-dioxanes the nitro group is preferably reduced with aluminum amalgam. In order to facilitate the splitting of the dioxane ring, the resulting amino group can also be acylated in the manner known per se. The said splitting can be carried out with acid agents such as dilute hydrochloric acid.

According to the reaction conditions the amino-diols are obtained as free bases or in the form of their salts, preferably as salts with acids, such as hydrohalic acids, for example hydrochloric acid, or sulfuric acid, phosphoric acids, perchloric acid, acetic acid, citric acid, oxalic acid, tartaric acid, ascorbic acid, methane sulfonic acid, hydroxy-ethane sulfonic acid, p-toluene sulfonic acid or salicylic acid, p-amino-salicylic acid or acetyl salicylic acid these are known pharmaceutically acceptable acids. The bases can be converted into their salts in the manner known per se and salts obtained can be converted in the customary manner into their bases.

The alkyn-1-als used as starting materials can be prepared in the manner known per se. Thus corresponding alkyl bromides can be condensed with sodium acetylide, the resulting alkyns converted into their metal compounds, for example with ethyl magnesium bromide, these reacted with ortho-formic acid ester and the resulting acetals hydrolyzed with acid agents to the aldehydes.

The invention also comprises any modification of the process in which a product obtainable as an intermediate at any stage of the complete process is used as starting material and the remaining step or steps are carried out or in which the process is interrupted at any stage.

The following examples illustrate the invention:

*Example 1*

25.0 grams of pentadec-2-ynal-(1) and 10.0 grams of nitroethanol are cooled to 0° C., treated with a cooled suspension of 1 gram of powdered potassium carbonate in 45 cc. of methanol, the whole rendered acid after 15 minutes with 1.5 cc. of concentrated hydrochloric acid in 2.5 cc. of methanol and the solution extracted with ether. The ether extracts are washed with water and dried over sodium sulfate. The yellow syrup obtained after evaporation of the ether is dissolved in 20 cc. of ether, the solution diluted with 200 cc. of pentane and the whole allowed to stand for 16 hours at 22° C. The resulting crystals are filtered off and the mother liquor evaporated and treated with 125 cc. of pentane. Further crystals are thereby caused to deposit, which are combined with the first. On recrystallization from pentane the product melts at 71–72.5° C. It is the threo-1:3-dihydroxy-2-nitro-heptadec-4-yn of the formula

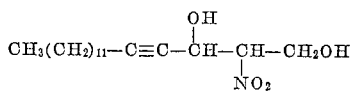

The filtrate obtained above is allowed to stand at 0° C. for 48 hours and the resulting crystals filtered off. The compound thus obtained, namely erythro-1:3-dihydroxy-2-nitro-heptadec-4-yn of the formula

when recrystallized from chloroform-pentane, melts at 44–47° C.

100 mg. of the pure threo-compound in 0.5 cc. of freshly distilled benzaldehyde are subjected to the addition of two portions taken on the end of a spatula of freshly fused and powdered zinc chloride and the whole shaken for 8 days at 18° C. in 5 cc. of absolute benzene. The liquid is filtered off and the zinc chloride residue washed twice with fresh benzene and the whole of the filtrate is freed from benzene under vacuum and from excess of benzaldehyde under high vacuum. The residue is distributed between ether and water and the ether solution washed with 2 N-sodium carbonate solution and then with water, dried over sodium sulfate and evaporated under vacuum. The residual oil is a mixture of the m-dioxane compounds, isomeric in position 2 of the formulae

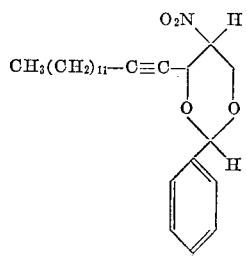

and

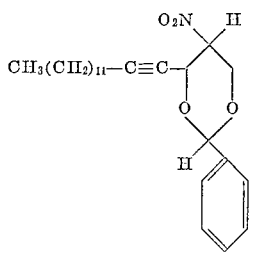

3.0 grams of this dioxane mixture are dissolved in 100 cc. of ether and 7 cc. of water added together with a quantity of aluminum amalgam obtained from 4 grams of aluminum. The whole is allowed to stand for 15 hours at room temperature and the sludge formed is filtered with suction and extracted three times with boiling ether. The combined ether extracts are dried over sodium sulfate, filtered and evaporated under vacuum. The residue, a colorless oil, is a mixture of the threo-amino compounds isomeric in position 2 of the m-dioxane ring.

3.0 grams of this dioxane mixture are dissolved in 5 cc. of absolute pyridine, treated with 3 cc. of acetic anhydride and the whole allowed to stand for 15 hours at 20° C. with exclusion of moisture. It is then evaporated under vacuum at 40° C., the residue taken up in ether and the ether solution washed with 2 N-hydrochloric acid, then with 2 N-sodium carbonate solution and finally with water, dried over sodium sulfate and evaporated. 500 mg. of the resulting isomer mixture are dissolved in 19 cc. of dioxane and treated with 19 cc. of 4 N-hydrochloric acid. The reaction mixture is heated for 30 minutes on a steam bath, concentrated somewhat under vacuum, ether added and the whole extracted with water. The aqueous, hydrochloric acid extract is rendered alkaline with potassium carbonate and the resulting amino-diol extracted with ether. The ether extracts, after washing and drying over sodium sulfate, are evaporated and the threo-1:3-dihydroxy-2-amino-heptadec-4-yn obtained, which can be recrystallized from chloroform-pentane and then melts at 78–80° C. It has the formula

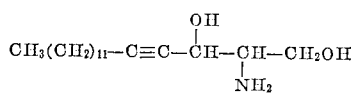

2.0 grams of crude threo-1:3-dihydroxy-2-amino-heptadec-4-yn are heated on a steam bath for 4 hours in 50 cc. of absolute tetrahydrofurane with 1.5 grams of lithium-aluminum hydride. Decomposition is then carried out with 4 N-hydrochloric acid with ice cooling, followed by concentration somewhat under vacuum, addition of ether and washing of the ethereal solution with 4 N-hydrochloric acid, 2 N-sodium carbonate solution and with water. The ether extracts are dried over sodium sulfate and evaporated under vacuum. The residue yields after recrystallization from chloroform-pentane, the colorless threo-trans - 1:3 - dihydroxy - 2 - amino-heptadec-4-ene of the formula

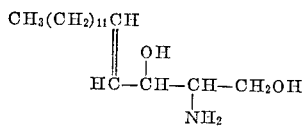

which melts at 88–91° C. A somewhat less pure product is obtained when the lithium-aluminum hydride solution is treated not with hydrochloric acid but with about 10 cc. of water, followed by filtration and evaporation of the filtrate.

The same product is obtained by acid isomerization of the threo-cis-1:3-dihydroxy-2-amino-heptadec-4-ene of the formula

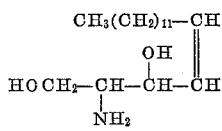

described in Example 5, by heating for 45 minutes under reflux with dilute sulfuric acid in aqueous dioxane.

The pentadec-2-ynal-(1) used as starting material can be prepared in the following manner:

Into a 6-liter flask with an acetone-Dry Ice cooler are introduced 3000 cc. of liquid ammonia and this is treated, with stirring, with 110 grams of sodium. Acetylene is simultaneously passed in until decolorisation takes place. 2000 cc. of dimethyl formamide and 850 grams of lauryl bromide are then added, and the ammonia is evaporated. The mixture is heated for 2 hours at 65° C. with stirring under a weak current of nitrogen, 1000 cc. of water are slowly added dropwise with ice-cooling and the dark brown mixture is extracted with ether. The ether fractions are washed 3 times with 2 N-hydrochloric acid and then until neutral with water, dried over sodium sulfate, filtered and evaporated. The resulting colorless tetradecyn-(1) is distilled under a pressure of 0.7 mm. and passes over at 70–78° C.; $n_D^{20} = 1.4400$.

In a four-necked, ground jointed flask with stirrer, cooler and dropping funnel 5 grams of magnesium, activated with iodine, are covered with ether and subjected to the dropwise addition of 32 grams of ethyl bromide in 50 cc. of absolute ether. To the Grignard-solution are added slowly 31 grams of tetradecyn-(1) in 50 cc. of absolute ether and the whole is boiled for 5 hours under reflux. Thereupon 31 grams of ortho-formic acid ethyl ester in 50 cc. of absolute ether are slowly allowed to flow in and the mixture further boiled overnight under reflux. The reaction mixture is treated by the careful dropwise addition of an about 20% aqueous ammonium chloride solution, with ice cooling and stirring, for the purpose of decomposition. The ether phase is separated off and washed twice with water, dried over sodium sulfate, filtered and evaporated. The residue is subjected to a predistillation under about 11 mm. pressure at a bath temperature of 150° C. in order to avoid any excessive foaming such as might take place on immediate high vacuum distillation. The pentadecynal-acetal then boils at 118–124° C. under 0.15 mm. pressure. The colorless oil has a refractive index of 1.4472 at 20° C.

35.5 grams of the resulting acetal are boiled with 32 cc. of water, 3.2 cc. of 2 N-hydrochloric acid and about 100 cc. of dioxane in a four-necked, ground jointed flask provided with stirrer, cooler and introduction tube for 6 hours with stirring at about 110° C. bath temperature in a nitrogen atmosphere. The majority of the dioxane is then distilled off in a water-jet vacuum at about 50° C., the residue taken up in ether and the ether solution washed with 2 N-sodium carbonate solution and then until neutral with water, dried over sodium sulfate, filtered and evaporated. On distillation of the residue, the resutling pentadec-2-ynal-(1) passes over at 105–115° C. under 0.3 mm. pressure; $n_D^{20} = 1.4607$.

*Example 2*

4.0 grams of the threo-1:3-dihydroxy-2-nitro-heptadec-4-yn described in Example 1 are dissolved in 30 cc. of ethanol and slowly added dropwise, with ice cooling and stirring, to a mixture of 10 cc. of concentrated hydrochloric acid and 10 cc. of ethanol. At the same time 8.0 grams of zinc dust are added in small portions and the reaction mixture is supplemented at intervals of about 5–10 minutes four times, each time with 5 cc. of concentrated hydrochloric acid. Stirring is then continued at room temperature for about a further 20–30 minutes. Any foaming can be controlled by spraying in small quantities of alcohol. The reaction mixture is filtered with suction, the excess of zinc dust washed with water and ethanol and the filtrate rendered alkaline with 10 N-caustic soda solution. Extraction is then carried out with ether and the ethereal extract washed until neutral with water, dried over sodium sulfate, filtered and evaporated. The crystalline residue, on recrystallization from chloroformpentane, gives the colorless threo-1:3-dihydroxy-2-aminoheptadec-4-yn of the formula

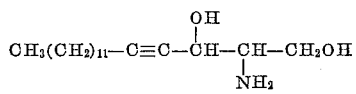

It melts at 78–80° C.

The above reduction can also be carried out with a weak acetic acid solution of aluminum amalgam or with iron and acetic acid.

*Example 3*

30 mg. of sodium are dissolved in 20 cc. of absolute ethanol and 550 mg. are added of the mixture, obtained in Example 1, of the threo-nitro-m-dioxane compound isomeric in the 2-position of the dioxane ring. After 2 minutes, the solution is acidified with glacial acetic acid and evaporated to dryness. The residue is distributed between ether and water, the ether fraction washed until neutral with water, dried over sodium sulfate and evaporated under vacuum to dryness. After addition of pentane and recrystallization from pentane, a mixture is obtained of the erythro-2-phenyl-4-tetradec-1'-ynyl-5-nitro-m-dioxanes isomeric in position 2 of the dioxane ring. The reduction of the nitro group and the acetylation of the amino group produced are carried out by methods analogous to those described in Example 1.

420 mg. of the resulting 5-acetamino-m-dioxane mixture are heated on a steam bath in 32 cc. of a mixture of 4 N-hydrochloric acid-dioxane (1:1) for 30 minutes. The solution is evaporated under vacuum to the commencement of crystallization and then diluted with 20 cc. of ether. The hydrochloride of the amino-diol, produced in fine needles, is filtered with suction and well washed with ether for complete removal of the benzaldehyde. The hydrochloride is suspended in chloroform in a separating funnel and shaken with 2 N-sodium carbonate solution. The chloroform extracts are washed with water and dried over sodium sulfate. After removal of the chloroform under vacuum, the residue is dissolved in a little ether and pentane added. The erythro-1:3-dihydroxy-2-amino-heptadec-4-yn of the formula

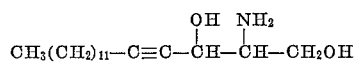

is thus obtained. It melts at 71–73.5° C.

2.0 grams of crude erythro-1:3-dihydroxy-2-amino-heptadec-4-yn are heated for 4 hours on a steam bath in 50 cc. of absolute tetrahydrofurane with 1.5 grams of lithium-aluminum hydride. Decomposition is then carried out with 4 N-hydrochloric acid with ice cooling, followed by concentration somewhat under vacuum and extraction with ether. The ethereal solution is washed with 4 N-hydrochloric acid, 2 N-sodium carbonate solution and water, dried over sodium sulfate and evaporated under vacuum. In this manner there is obtained the colorless erythro-trans-1:3-dihydroxy-2-amino-heptadec-4-ene of the formula

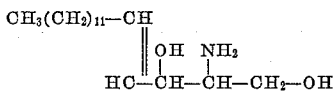

which melts at 60–65° C.

A somewhat less pure product is obtained when the lithium-aluminum hydride solution is treated, not with hydrochloric acid but with about 10 cc. of water, filtered and evaporated.

The same product is obtained by acid isomerization, of the erythro-cis-1:3-dihydroxy-2-amino-heptadec-4 - ene, described in Example 5 below, by heating under reflux in aqueous dioxane with dilute sulfuric acid for 45 minutes.

*Example 4*

When the erythro-1:3-dihydroxy-2-nitro-heptadec-4-yn, described in Example 1, is reduced by the method described in Example 2, the crystalline erythro-1:3-dihydroxy-2-amino-heptadec-4-yn of the formula

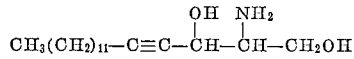

is obtained, which after recrystallization from ether and pentane melts at 71–73.5° C. The above reduction can also be carried out with a weak acetic acid solution of aluminum amalgam or with iron and acetic acid.

*Example 5*

1.50 grams of threo-1:3-dihydroxy-2-amino-heptadec-4-yn described in Examples 1 and 2 are dissolved in 40 cc. of absolute alcohol, treated with 250 mg. of Lindlar catalyst and shaken at room temperature under normal pressure in a hydrogen atmosphere. After about 1 hour the absorption of hydrogen ceases. The solution is freed from catalyst by filtration and evaporated under vacuum at 40–50° C. The solid, colorless residue yields from chloroform-pentane crystals of M.P. 77–79° C. to which is ascribed the structure of threo-cis-1:3-dihydroxy-2-amino-heptadec-4-ene of the formula

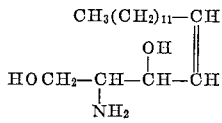

In an analogous manner the erythro-1:3-dihydroxy-2-amino-heptadec-4-yn described in Examples 3 and 4, after recrystallization from acetonitrile, yields, the erythro-cis-1:3-dihydroxy-2-amino-heptadec-4-ene of the formula

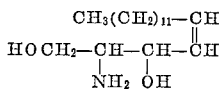

which crystallizes in colorless crystals of M.P. 66–68° C.

*Example 6*

19.0 grams of undec-2-ynal-(1) and 10.0 grams of nitroethanol are cooled to 0° C., treated with a cooled suspension of 1 gram of powdered potassium carbonate in 45 cc. of methanol, the whole rendered acid after 15 minutes with 1.5 cc. of concentrated hydrochloric acid in 2.5 cc. of methanol and the solution extracted with ether. The ether extracts are washed with water and dried over sodium sulfate. The yellow syrup obtained after evaporation of the ether is dissolved in 20 cc. of ether, the solution diluted with 200 cc. of pentane and the whole allowed to stand for 16 hours at 22° C. The resulting crystals are filtered off and the mother liquor evaporated and treated with 125 cc. of pentane. Further crystals are thereby caused to deposit, which are combined with the first. On recrystallization from pentane the product melts at 53–55° C. It is the threo-1:3-dihydroxy-2-nitro-tridec-4-yn of the formula

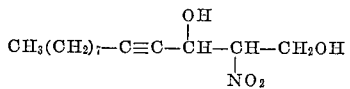

4.0 grams of threo-1:3-dihydroxy-2-nitro-tridec-4-yn described above are dissolved in 30 cc. of ethanol and slowly added dropwise, with ice cooling and stirring, to a mixture of 10 cc. of concentrated hydrochloric acid and 10 cc. of ethanol. At the same time 8.0 grams of zinc dust are added in small portions and the reaction mixture is supplemented at intervals of about 5–10 minutes four times, each time with 5 cc. of concentrated hydrochloric acid. Stirring is then continued at room temperature for about a further 20–30 minutes. Any foaming can be controlled by spraying in small quantities of alcohol. The reaction mixture is filtered with suction, the excess of zinc dust washed with water and ethanol and the filtrate rendered alkaline with 10 N-caustic soda solution. Extraction is then carried out with ether and the ethereal extract washed until neutral with water, dried over sodium sulfate, filtered and evaporated. The crystalline residue, on recrystallization from chloroform-pentane, gives the colorless threo-1:3-dihydroxy-2-amino-tridec-4-yn of the formula

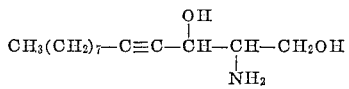

It melts at 67–68° C.

The above reduction can also be carried out with a weak acetic acid solution of aluminum amalgam or with iron and acetic acid.

2.0 grams of crude threo-1:3-dihydroxy-2-amino-tridec-4-yn are heated on a steam bath for 4 hours in 50 cc. of absolute tetrahydrofurane with 1.5 grams of lithium-aluminum hydride. Decomposition is then carried out with 4 N-hydrochloric acid with ice cooling, followed by concentration somewhat under vacuum, addition of ether and washing of the ethereal solution with 4 N-hydrochloric acid, 2 N-sodium carbonate solution and with water. The ether extracts are dried over sodium sulfate and evaporated under vacuum. The residue yields after recrystallization from chloroform-pentane, the colorless threo-trans-1:3-dihydroxy-2-amino-tridec-4 - ene of the formula

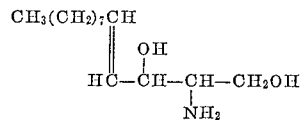

which melts at 73–78° C. A somewhat less pure product is obtained when the lithium-aluminum hydride solution is treated not with hydrochloric acid but with about 10 cc. of water, followed by filtration and evaporation of the filtrate.

The undec-2-ynal-(1) used as starting material can be prepared in the following manner:

Into a 6-liter flask with an acetone-dry ice cooler are introduced 3000 cc. of liquid ammonia and this is treated, with stirring, with 110 grams of sodium. Acetylene is simultaneously passed in until decolorization takes place. 2000 cc. of dimethyl formamide and 650 grams of octyl bromide are then added and the ammonia is evaporated. The mixture is heated for 2 hours at 65° C. with stirring under a weak current of nitrogen. 1000 cc. of water are slowly added dropwise with ice-cooling and the dark brown mixture is extracted with ether.

The ether fractions are washed 3 times with 2 N-hydrochloric acid and then until neutral with water, dried over sodium sulfate, filtered and evaporated. The resulting colorless decyn-(1) is distilled under a pressure of 760 mm. and passes over at 162–165° C.; $n_D^{25}=1.4262$.

In a four-necked ground jointed flask with stirrer, cooler and dropping funnel 5 grams of magnesium, activated with iodine, are covered with ether and subjected to the dropwise addition of 32 grams of ethyl bromide in 50 cc. of absolute ether. To the Grignard-solution are added slowly 22 grams of decyn-(1) in 50 cc. of absolute ether and the whole is boiled for 5 hours under reflux. Thereupon 31 grams of ortho-formic acid ethyl ester in 50 cc. of absolute ether are slowly allowed to flow in and the mixture further boiled overnight under reflux. The reaction mixture is treated by the careful dropwise addition of an about 20% aqueous ammonium chloride solution, with ice cooling and stirring, for the purpose of decomposition. The ether phase is separated off and washed twice with water, dried over sodium sulfate, filtered and evaporated. The undecynal-acetal then boils at 147–152° C. under 14 mm. pressure. The colorless oil has a refractive index of 1.4395 at 25° C.

35.5 grams of the resulting acetal are boiled with 32 cc. of water, 3.2 cc. of 2 N-hydrochloric acid and about 100 cc. of dioxane in a four-necked, ground jointed flask provided with stirrer, cooler and introduction tube for 6 hours with stirring at about 110° C. bath temperature in a nitrogen atmosphere. The majority of the dioxane is then distilled off in a water-jet vacuum at about 50° C. the residue taken up in ether and the ether solution washed with 2 N-sodium carbonate solution and then until neutral with water, dried over sodium sulfate, filtered and evaporated. On distillation of the residue, the resulting undec-2-ynal-(1) passes over at 118–124° C. under 13 mm. pressure; $n_D^{25}=1.4540$.

*Example 7*

1.50 grams of the threo-1:3-dihydroxy-2-amino-tridec-4-yn described in Example 6 are dissolved in 40 cc. of absolute alcohol, treated with 250 mg. of Lindlar catalyst and shaken at room temperature under normal pressure in a hydrogen atmosphere. After about 1 hour the absorption of hydrogen ceases. The solution is freed from catalyst by filtration and evaporated under vacuum at 40–50° C. The solid, colorless residue yield from chloroform-pentane crystals of M.P. 64–66° C. to which is ascribed the structure of threo-cis-1:3-dihydroxy-2-amino-tridec-4-ene of the formula

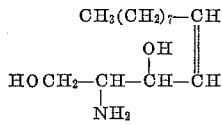

*Example 8*

22.0 grams of tridec-2-ynal-(1) and 10.0 grams of nitroethanol are cooled to 0° C., treated with a cooled suspension of 1 gram of powdered potassium carbonate in 45 cc. of methanol, the whole rendered acid after 15 minutes with 1.5 cc. of concentrated hydrochloric acid in 2.5 cc. of methanol and the solution extracted with ether. The ether extracts are washed with water and dried over sodium sulfate. The yellow syrup obtained after evaporation of the ether is dissolved in 20 cc. of ether, the solution diluted with 200 cc. of pentane and the whole allowed to stand for 16 hours at 22° C. The resulting crystals are filtered off and the mother liquor evaporated and treated with 125 cc. of pentane. Further crystals are thereby caused to deposit, which are combined with the first. On recrystallization from pentane the product melts at 62–64° C. It is the threo-1:3-dihydroxy-2-nitro-pentadec-4-yn of the formula

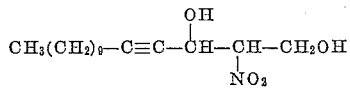

The filtrate obtained above is allowed to stand at 0° C. for 48 hours and the resulting crystals filtered off. The compound thus obtained, namely erythro-1:3-dihydroxy-2-nitro-pentadec-4-yn of the formula

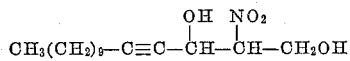

when recrystallized from chloroform-pentane, melts at 40–41° C.

4.0 grams of the threo-1:3-dihydroxy-2-nitro-pentadec-4-yn described above were dissolved in 30 cc. of ethanol and slowly added dropwise, with ice cooling and stirring, to a mixture of 10 cc. of concentrated hydrochloric acid and 10 cc. of ethanol. At the same time 8.0 grams of zinc dust are added in small portions and the reaction mixture is supplemented at intervals of about 5–10 minutes four times, each time with 5 cc. of concentrated hydrochloric acid. Stirring is then continued at room temperature for about a further 20–30 minutes. Any foaming can be controlled by spraying in small quantities of alcohol. The reaction mixture is filtered with suction, the excess of zinc dust washed with water and ethanol and the filtrate rendered alkaline with 10N-caustic soda solution. Extraction is then carried out with ether and the ethereal extract washed until neutral with water, dried over sodium sulfate, filtered and evaporated. The crystalline residue, on recrystallization from chloroformpentane, gives the colorless threo-1:3-dihydroxy-2-amino-pentadec-4-yn of the formula

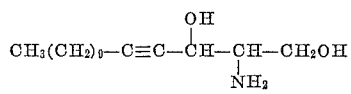

It melts at 75–77° C.

The above reduction can also be carried out with a weak acetic acid solution of aluminum amalgam or with iron and acetic acid.

2.0 grams of crude threo-1:3-dihydroxy-2-amino-pentadec-4-yn are heated on a steam bath for 4 hours in 50 cc. of absolute tetrahydrofurane with 1.5 grams of lithium-aluminum hydride. Decomposition is then carried out with 4 N-hydrochloric acid with ice cooling, followed by concentration somewhat under vacuum, addition of ether and washing of the ethereal solution with 4 N-hydrochloric acid, 2 N-sodium carbonate solution and with water. The ether extracts are dried over sodium sulfate and evaporated under vacuum. The residue yields after recrystallization from chloroform-pentane, the colorless threo-trans-1:3-dihydroxy-2-amino-pentadec-4-ene of the formula

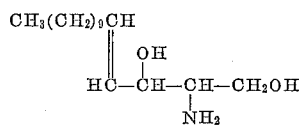

which melts at 83–85° C. A somewhat less pure product is obtained when the lithium-aluminum hydride solution is treated not with hydrochloric acid but with about 10 cc. of water, followed by filtration and evaporation of the filtrate.

The tridec-2-ynal-(1) used as starting material can be prepared in the following manner:

Into a 6-liter flask with an acetone-Dry Ice cooler are introduced 3000 cc. of liquid ammonia and this is treated, with stirring, with 110 grams of sodium. Acetylene is simultaneously passed in until decolorisation takes place. 2000 cc. of dimethyl formamide and 750 grams of decyl bromide are then added, and the ammonia is evaporated. The mixture is heated for 2 hours at 65° C. with stirring under a weak current of nitrogen. 1000 cc. of water are slowly added dropwise with ice-cooling and the dark brown mixture is extracted with ether.

The ether fractions are washed 3 times with 2 N-hydrochloric acid and then until neutral with water, dried over sodium sulfate, filtered and evaporated. The resulting colorless dodecyn-(1) is distilled under a pressure of 14 mm. and passes over 96–100° C.; $n_D^{20}=1.4324$.

In a four-necked, ground jointed flask with stirrer, cooler and dropping funnel 5 grams of magnesium, activated with iodine, are covered with ether and subjected to the dropwise addition of 32 grams of ethyl bromide in 50 cc. of absolute ether. To the Grignard-solution are added slowly 37 grams of dodecyn-(1) in 50 cc. of absolute ether and the whole is boiled for 5 hours under reflux. Thereupon 31 grams of ortho-formic acid ethyl ester in 50 cc. of absolute ether are slowly allowed to flow in and the mixture further boiled overnight under reflux. The reaction mixture is treated by the careful dropwise addition of an about 20% aqueous ammonium chloride solution, with ice cooling and stirring, for the purpose of decomposition. The ether phase is separated off and washed twice with water, dried over sodium sulfate, filtered and evaporated.

The tridecynal-acetal then boils at 170–175° C. under 12 mm. pressure. The colorless oil has a refractive index of 1.4430 at 25° C.

35.5 grams of the resulting acetal are boiled with 32 cc. of water, 3.2 cc. of 2 N-hydrochloric acid and about 100 cc. of dioxane in a four-necked, ground jointed flask provided with stirrer, cooler and introduction tube for 6 hours with stirring at about 110° C. bath temperature in a nitrogen atmosphere. The majority of the dioxane is then distilled off in a water-jet vacuum at about 50° C., the residue taken up in ether and the ether solution washed with 2 N-sodium carbonate solution and then until neutral with water, dried over sodium sulfate, filtered and evaporated. On distillation of the residue, the resulting tridec-2-ynal-(1) passes over at 148–152° C. under 14 mm. pressure; $n_D^{20} = 1.4565$.

*Example 9*

When the erythro-1:3-dihydroxy-2-nitro-pentadec-4-yn, described in Example 8, is reduced by the method described in Example 2, the crystalline erythro-1:3-dihydroxy-2-amino-pentadec-4-yn of the formula

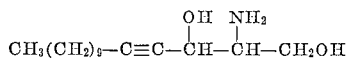

is obtained, which after recrystallization from ether and pentane melts at 56–58° C. The above reduction can also be carried out with a weak acetic acid solution of aluminum amalgam or with iron and acetic acid.

*Example 10*

2.0 grams of crude erythro-1:3-dihydroxy-2-aminopentadec-4-yn are heated for 4 hours on a steam bath in 50 cc. of absolute tetrahydrofurane with 1.5 grams of lithium-aluminum hydride. Decomposition is then carried out with 4 N-hydrochloric acid with ice-cooling, followed by concentration somewhat under vacuum and extraction with ether. The ethereal solution is washed with 4 N-hydrochloric acid, 2 N-sodium carbonate solution and water, dried over sodium sulfate and evaporated under vacuum. In this manner there is obtained the colorless erythro-trans-1:3-dihydroxy-2-amino-pentadec-4-ene of the formula

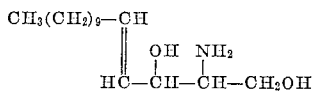

which melts at 56–60° C.

*Example 11*

1.50 grams of the threo-1:3-dihydroxy-2-aminopentadec-4-yn described in Example 8 are dissolved in 40 cc. of absolute alcohol, treated with 250 mg. of Lindlar catalyst and shaken at room temperature under normal pressure in a hydrogen atmosphere. After about 1 hour the absorption of hydrogen ceases. The solution is freed from catalyst by filtration and evaporated under vacuum at 40–50° C. The solid, colorless residue yields from chloroform-pentane crystals of M.P. 70–71° C. to which is ascribed the structure of threo-cis-1:3-dihydroxy-2-amino-pentadec-4-ene of the formula

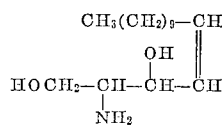

In an analogous manner the erythro-1:3-dihydroxy-2-amino-pentadec-4-yn described in Example 9, after recrystallization from acetonitrile, yields the erythro-cis-1:3-dihydroxy-2-amino-pentadec-4-ene of the formula

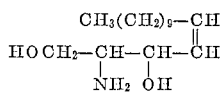

which crystallizes in colorless crystals of M.P. 49–52° C.

*Example 12*

5 grams of pure threo-1,3-dihydroxy-2-nitro-heptadec-4-yn, obtained as described in Example 1, are dissolved in 40 cc. of absolute tetrahydrofurane and the solution slowly added dropwise, while stirring, into a solution of 5.4 grams of lithium-aluminum hydride in 90 cc. of absolute tetrahydrofurane. The temperature rises to 65° C. There follows refluxing for 5 hours. The excess lithium-aluminum hydride is destroyed with 35 cc. of water, the precipitated sludge removed by filtering with suction, and the filtrate evaporated at 40° C. in a water pump vacuum. The residue is sublimed in a high vacuum at a bath temperature of 120° C., and the sublimate crystallized from a mixture of chloroform and pentane. A product of melting point 89–91° C. is obtained which gives no depression in the mixed melting point test in admixture with threo-trans-1,3-dihydroxy-2-amino-heptadec-4-ene melting at 88–91° C. and obtained in a different manner.

*Example 13*

10 grams of pure threo-1,3-dihydroxy-2-nitroheptadec-4-yn, obtained according to Example 1, are dissolved in 250 cc. of absolute ethyl acetate and the solution is treated with hydrogen at room temperature and atmospheric pressure in the presence of 1 g. of Lindlar catalyst. On absorption of one equivalent of hydrogen the reaction ceases. The solution is freed from catalyst and evaporated at 40° C. under reduced pressure. The residue is recrystallized from a mixture of chloroform and pentane and gives lustrous leaflets of melting point 76–77° C. corresponding to the formula

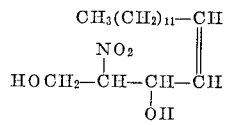

*Example 14*

1 gram of pure threo-1,3-dihydroxy-2-nitro-heptadec-4-yn, obtained according to Example 1, is dissolved in 25 cc. of rectified alcohol and the solution shaken at room temperature and under atmospheric pressure with 50 mg. of platinum oxide in the presence of hydrogen. When about 3.8 molecular equivalents of hydrogen have been consumed, the uptake of hydrogen slows down markedly. Hydrogenation is interrupted, the crystalline product redissolved by heating, the solution filtered while warm, and the filtrate evaporated. The residue is recrystallized from a mixture of chloroform and pentane. There is obtained in this manner a mixture of melting point 72–83° C. consisting mainly of threo-1,3-dihydroxy-2-amino-heptadecane and the unsaturated cis-threo-1,3-dihydroxy-2-amino-heptadec-4-ene.

*Example 15*

1 gram of pure threo-1,3-dihydroxy-2-nitroheptadec-4-yn, obtained according to Example 1, is dissolved in 25 cc. of rectified alcohol and shaken at room temperature under atmospheric pressure in the presence of 100 mg. of Lindlar catalyst and hydrogen. One equivalent of hydrogen is taken up very quickly. After the absorption of another 2.6 molecular equivalents hydrogenation ceases. The reaction solution is worked up in the usual manner and crystallized from a mixture of chloroform and pentane to obtain a mixure of melting point 63–69° C. containing the desired threo-cis-1,3-dihydroxy-2-amino-heptadec-4-ene.

Example 16

(a) 257 mg. of threo-trans-1,3-dihydroxy-2-aminopentadec-4-ene are dissolved in about 2.5 cc. of rectified ethanol and mixed with an ethanolic solution of 126 mg. of oxalic acid dihydrate in about 2 cc. of absolute ethanol. A white precipitate forms immediately. On filtering, washing with ethanol and drying the resulting powder melts at 212–214° C. with decomposition. This neutral oxalate is insoluble in water and all other customary organic solvents.

(b) Starting from 283 mg. of threo-1,3-dihydroxy-2-amino-heptadec-4-yn is obtained in analogous manner the neutral oxalate of threo-1,3-dihydroxy-2-amino-heptadec-4-yn which melts at 207–209° C. It is insoluble in water and in all other customary organic solvents.

(c) 257 mg. of erythro-trans-1,3-dihydroxy-2-amino-heptadec-4-ene are dissolved in 1.5 cc. of absolute ethyl acetate and mixed with 0.5 cc. of a 2.0 N-solution of hydrochloric acid in ethyl acetate. The solution of the hydrochloride is evaporated to dryness and the residue which dissolved in water to give a clear solution is recrystallized from a mixture of absolute ethanol and ether. Sintering and decomposition of the resulting needles begins at about 60° C.

Starting from 0.001 mol of another of the amino diols described in the preceding examples and proceeding in analogous manner there are obtained the corresponding hydrochlorides forming colorless needles which dissolve well in water and begin to sinter and decompose at about the melting point of the free base.

What is claimed is:

1. A member of the group consisting of unsaturated aliphatic amino-diols of the formula:

$$CH_3(CH_2)_n—A—CHOH—CHNH_2—CH_2OH$$

in which A stands for —CH=CH— and $n$ for the odd whole number 7–11, their N-lower alkanoyl derivatives, and their salts with pharmaceutically acceptable acids.

2. Threo-trans-1:3 - dihydroxy - 2 - amino - heptadec-4-ene.

3. Threo - cis - 1:3 - dihydroxy - 2 - amino - heptadec-4-ene.

4. Threo-trans - 1:3 - dihydroxy - 2 - amino - tridec-4-ene.

5. Threo - cis - 1:3 - dihydroxy - 2 - amino - tridec-4-ene.

References Cited in the file of this patent

UNITED STATES PATENTS

| | | |
|---|---|---|
| 2,163,720 | Vaughn | June 27, 1939 |
| 2,194,374 | Maxwell | Mar. 19, 1940 |
| 2,196,554 | Guinot | Apr. 9, 1940 |
| 2,232,867 | Reppe | Feb. 25, 1941 |
| 2,375,536 | De Groote | May 8, 1945 |

OTHER REFERENCES

Ahmad: "J. Indian Chem. Soc.," vol. 31, pages 309–310 (1954).

Grob et al.: "Experientia," vol. 12, pages 334–335 (1956).

Grob et al.: "Chem. and Ind.," 1956, pages 660–661 (1956).

(Copies of above references in Pat. Off. Sci. Lib.)